(12) United States Patent
Takasugi et al.

(10) Patent No.: US 9,298,365 B2
(45) Date of Patent: Mar. 29, 2016

(54) STORAGE MEDIUM, INFORMATION PROCESSING APPARATUS AND CHARACTER RECOGNITION METHOD

(71) Applicant: FUJITSU LIMITED, Kawasaki-shi, Kanagawa (JP)

(72) Inventors: Aya Takasugi, Kawasaki (JP); Tetsuro Hoshi, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 71 days.

(21) Appl. No.: 14/256,296

(22) Filed: Apr. 18, 2014

(65) Prior Publication Data

US 2014/0340333 A1 Nov. 20, 2014

(30) Foreign Application Priority Data

May 16, 2013 (JP) ................................. 2013-104134

(51) Int. Cl.
| G06F 3/041 | (2006.01) |
| G06F 3/0488 | (2013.01) |
| G06F 3/01 | (2006.01) |
| G06T 11/20 | (2006.01) |
| G06K 9/00 | (2006.01) |

(52) U.S. Cl.
CPC ............ G06F 3/04883 (2013.01); G06F 3/018 (2013.01); G06T 11/203 (2013.01); G06K 9/00402 (2013.01)

(58) Field of Classification Search
None
See application file for complete search history.

(56) References Cited

U.S. PATENT DOCUMENTS

2012/0139859 A1* 6/2012 Ohira ...................... G06F 3/018
345/173
2014/0176564 A1* 6/2014 Tang ..................... G06F 17/214
345/471

FOREIGN PATENT DOCUMENTS

JP 7-121660 5/1995
JP 11-134437 5/1999

\* cited by examiner

*Primary Examiner* — Joseph Haley
(74) *Attorney, Agent, or Firm* — Staas & Halsey LLP

(57) ABSTRACT

An information processing apparatus includes a storage unit configured to store a first information in which a character code and an image data of a character are associated with each other and an operation unit. The operation unit is configured to detect a second information indicating an input position of each of a plurality of characters input through a handwriting input and a plurality of character codes associated with the plurality of characters, acquire a plurality of first image data associated with the plurality of characters codes by referring to the first information, generate a second image data by combining the plurality of first image data based on the second information, and output an image data of the character associated with the second image data or the character code associated with the second image data by referring to the first information.

15 Claims, 17 Drawing Sheets

*FIG. 5*

| CHARACTER SHAPE TABLE | 111 |
|---|---|
| CHARACTER CODE | IMAGE DATA |
| 706b | G1 ( 火 ) |
| 30af | G2 ( ク ) |
| 81fc | G3 ( 臼 ) |
| 30bd | G4 ( ソ ) |
| 72ac | G5 ( 犬 ) |
| ff17 | G6 ( ７ ) |
| ... | ... |
| 7130 | G7 ( 焰 ) |
| ... | ... |

*FIG. 6*

| DICTIONARY TABLE | 112 |
|---|---|
| CHARACTER CODE | STROKE INFORMATION |
| 30bd | P1 |
| 706b | P2 |
| 72ac | P3 |
| ff17 | P4 |
| 30af | P5 |
| 81fc | P6 |
| ... | ... |

FIG. 8

| SIMILARITY HISTORY TABLE | | | 114 |
|---|---|---|---|
| THE NUMBER OF INPUT STROKES | CHARACTER CODE | SIMILARITY | |
| 1 | 30bd | 17 | |
| 2 | 706b | 53 | |
| 3 | 706b | 68 | |
| 4 | 706b | 91 | |
| 5 | 72ac | 28 | |

FIG. 9

| COMBINATION TABLE | | | | |
|---|---|---|---|---|
| CHARACTER CODE | DEFORMED IMAGE DATA | MINIMUM COORDINATE | MAXIMUM COORDINATE |
| 706b | G11 | ( 3, 25 ) | ( 42, 78 ) |
| 30af | G21 | ( 48, 12 ) | ( 77, 41 ) |
| 81fc | G31 | ( 46, 36 ) | ( 80, 85 ) |

115

SIMILARITY HISTORY TABLE — 114d

| THE NUMBER OF INPUT STROKES | CHARACTER CODE | SIMILARITY |
|---|---|---|
| 1 | 30af ( ク ) | 86 |

SIMILARITY HISTORY TABLE — 114e

| THE NUMBER OF INPUT STROKES | CHARACTER CODE | SIMILARITY |
|---|---|---|
| 1 | 30af ( ク ) | 86 |
| 2 | ff17 ( 7 ) | 39 |

STORAGE MEDIUM, INFORMATION PROCESSING APPARATUS AND CHARACTER RECOGNITION METHOD

CROSS-REFERENCE TO RELATED APPLICATION

This application is based upon and claims the benefit of priority of the prior Japanese Patent Application No. 2013-104134 filed on May 16, 2013, the entire contents of which are incorporated herein by reference.

FIELD

The embodiments discussed herein are related to an information processing apparatus, a character recognition method and a storage medium having a character recognition program stored therein.

BACKGROUND

A so-called character recognition technology has been utilized. An apparatus that performs a character recognition receives a handwriting input of a character input by a user using an input device (e.g., a touch panel or a mouse) and estimates a character code of the character intended to be input by the user. When a plurality of candidates exist for the character codes, the apparatus may prompt the user to select one of the candidates. One of the issues in the character recognition technology is that a recognition accuracy of the character needs to be improved.

For example, there is a suggested method in which a plurality of input frames are formed in an input area of a character and a plurality of components (e.g., 編, 旁, 冠) obtained by dividing a single Chinese character is input into each input frame. In the suggested technology, a correspondence of a set of components and a character is stored in a storage module in advance to compare the set of components input in each input frame and the set of components stored in the storage module to display a character containing the set of components input in the frame in a display apparatus.

Further, there is another suggested method in which a stroke data input in handwriting is generated in conjunction with a stroke data input previously for every one stroke indicating a line made by a single movement in handwriting a character input in handwriting and the stroke data is compared with a dictionary character data made up of the stroke data prepared in advance to execute a character recognition while determining a similarity between stroke data input in handwriting and the dictionary character data. When the similarity of the stroke data input in handwriting to the dictionary character data becomes zero, the stroke data input in handwriting generated through a handwriting input of one stroke before is segmented as a single character and the dictionary character data containing the stroke data input in handwriting is displayed as a candidate character.

See, for example, Japanese Laid-Open Patent Publication No. 07-121660 and Japanese Laid-Open Patent Publication No. 11-134437.

In the methods described above, the dictionary data utilized for collating with the set of components or the stroke data are prepared in advance for each target character to be recognized. However, the number of characters is enormous and thus, it is not easy to collect all of characters in the dictionary data. For example, a preparation work for the dictionary data requires times for, for example, extracting plural stroke information that become samples for each character from multiple users and registering the stroke information in the dictionary data. Therefore, some characters may not be registered in the dictionary data. For example, some characters, such as a variant character or an external character, having a low use frequency may not be registered in the dictionary data. Accordingly, how to recognize the characters unregistered in the dictionary data with high accuracy is in question.

SUMMARY

According to an aspect of the embodiment, an information processing apparatus includes a storage unit configured to store a first information in which a character code and an image data of a character are associated with each other; and an operation unit. The operation unit is configured to detect a second information indicating an input position of each of a plurality of characters input through a handwriting input and a plurality of character codes associated with the plurality of characters, acquire a plurality of first image data associated with the plurality of characters codes by referring to the first information, generate a second image data by combining the plurality of first image data based on the second information, and output an image data of the character associated with the second image data or the character code associated with the second image data by referring to the first information.

The object and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

BRIEF DESCRIPTION OF DRAWINGS

FIG. 5 is a view illustrating an example of a character shape table.

FIG. 6 is a view illustrating an example of a dictionary table.

FIG. 8 is a view illustrating an example of a similarity history table.

FIG. 9 is a view illustrating an example of a combination table.

DESCRIPTION OF EMBODIMENTS

First Embodiment

Figure 1:
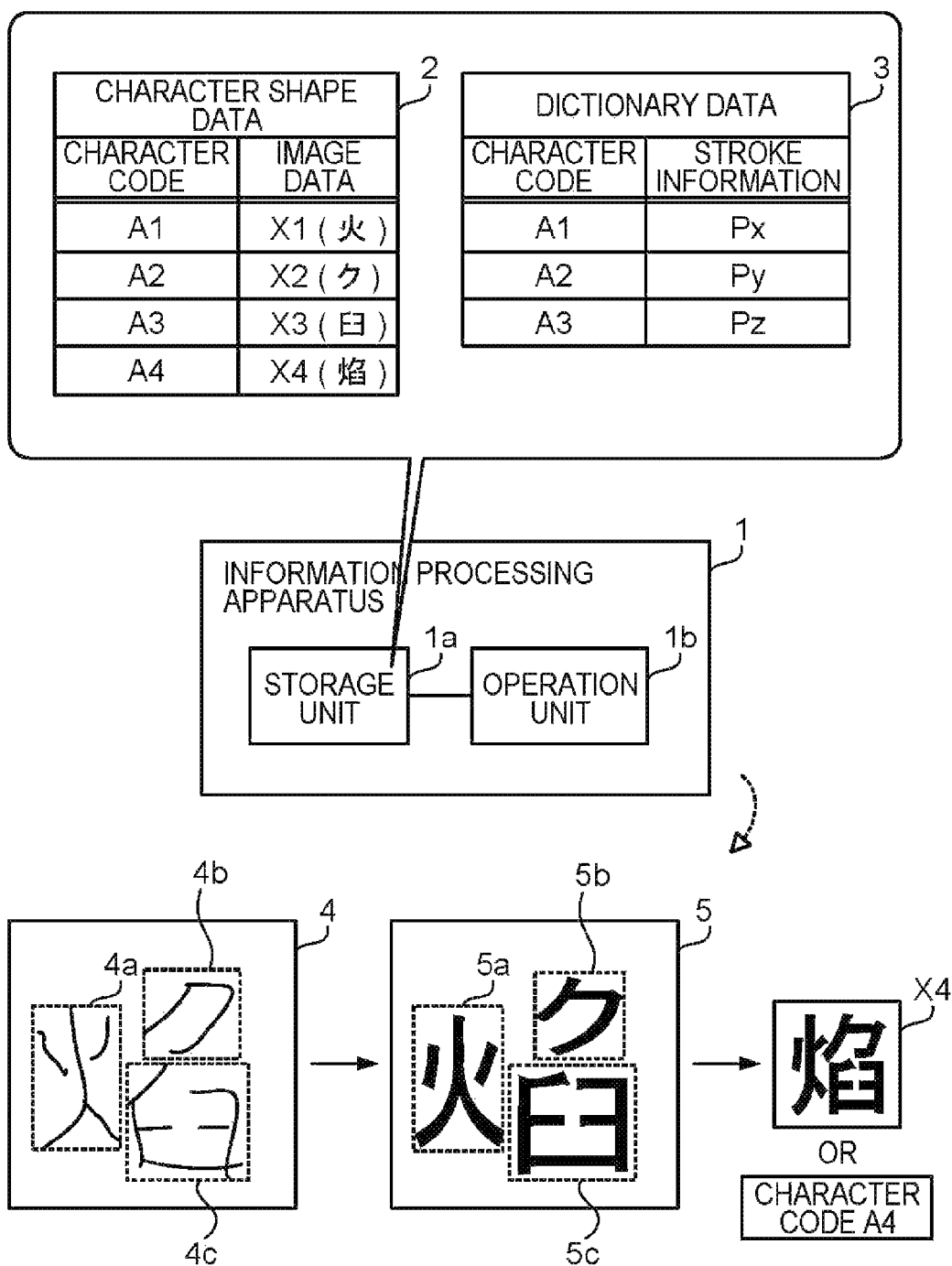
FIG. 1 is a view illustrating an information processing apparatus of a first embodiment.

Hereinbelow, exemplary embodiments of a display control apparatus, a system and a display control program disclosed in the present disclosure will be described in detail with reference to the drawings. Further, the embodiments are not intended to limit the disclosed technique. FIG. 1 is a view illustrating an information processing apparatus of a first embodiment. The first information processing apparatus 1 performs a character recognition for a character input in handwriting by a user. For example, the user may perform a handwriting input to the first information processing apparatus using an input device, such as a touch panel, a touch pad or a mouse, that is provided in the first information processing apparatus. The input device may be an external connection device of the first information processing apparatus. Here, a line made by a single movement in handwriting for a character input in handwriting may be referred to as a stroke. Further, information which includes a set of strokes forming a single character or a writing sequence (a sequence of strokes) may be referred to as stroke information.

The first information processing apparatus includes a storage unit 1a and an operation unit 1b. The storage unit 1a may be a non-volatile storage device such as RAM (Random Access Memory), or a volatile storage device such as HDD (Hard Disk Drive) or a flash memory. The operation unit 1b may include, for example, CPU (Central Processing Unit), DSP (Digital Signal Processor), ASIC (Application Specific Integrated Circuit), FPGA (Field Programmable Gate Array). The operation unit 1b may be a processor which executes a program. A plurality of processor sets (a multi-processor) may also be included as the "processor".

The storage unit 1a stores a character shape data 2 in which a character code and an image data of the character are associated with each other. For example, the character shape data 2 includes, for example, an association relationship between a character code A1 and an image data X1 (which indicates a character "火"), an association between a character code A2 and an image data X2 (which indicates a character "ク"), an association between a character code A3 and an image data X3 (which indicates a character "日"), and association between a character code A4 and an image data X4 (which indicates a variant character of a character "焔").

Further, the storage unit 1a stores a dictionary data 3 in which a character code and a reference stroke information are associated with each other. For example, the dictionary data 3 includes an association between the character code A1 and stroke information Px, an association between the character code A2 and stroke information Py, and an association between the character code A3 and stroke information Pz. Here, the stroke information regarding the character code A4 is not registered in the dictionary data 3.

The operation unit 1b detects position information which indicates input positions of a plurality of characters input through a handwriting input by the user. For example, the operation unit 1b detects a plurality of characters code associated with a plurality of input characters based on the stroke information input in handwriting and the dictionary data 3 stored in the storage unit 1a.

For example, the operation unit 1b receives an input data 4 through the handwriting input. The input data 4 includes characters 4a, 4b and 4c. Each of the characters 4a, 4b and 4c is formed with a plurality of strokes input by the user. The operation unit 1b detects the characters 4a, 4b and 4c and the position information indicating the input position of each of the characters 4a, 4b and 4c. The operation unit 1b may collate the stroke information of each of the characters 4a, 4b and 4c with each of the stroke information Px, Py and Pz registered in the dictionary data 3 in order to detect the character codes A1, A2 and A3 associated with the characters 4a, 4b and 4c.

Further, the operation unit 1b may specify an image data associated with the characters 4a, 4b and 4c from the character shape data 2 to acquire the character codes A1, A2 and A3 for the characters 4a, 4b and 4c. Further, the operation unit 1b may merge candidates of respective character codes acquired from the character shape data 2 and the dictionary data 3 to detect the character codes A1, A2 and A3 associated with the characters 4a, 4b and 4c. For example, for the character 4a, the candidates for the plurality of character codes may be detected from the character shape data 2 and as a result, the candidates for the plurality of character codes may be detected from the dictionary data 3. In such a case, the candidate of the character code determined as one having high accuracy through collation with both the character shape data 2 and the dictionary data 3 may be determined as a character code for the character 4a.

The operation unit 1b refers to the character shape data 2 to acquire a plurality of first image data associated with the plurality of detected character codes. For example, the operation unit 1b refers to the character shape data 2 to acquire the image data X1, X2 and X3 for the character codes A1, A2 and A3.

The operation unit 1b combines the plurality of the first image data based on the detected position information to generate a second image data. For example, the operation unit 1b maintains a relative positional relationship between the input characters 4a, 4b and 4c based on the position information of each of the detected characters 4a, 4b and 4 in order to dispose and form the image data X1, X2 and X3 as a single image data to generate the image data 5.

In this case, the operation unit 1b may deform the image data X1, X2 and X3 to generate the image data 5a, 5b and 5c, respectively. The image data 5a is obtained by deforming the image data X1. The image data 5b is obtained by deforming the image data X2. The image data 5c is obtained by deforming the image data X3.

For example, a rectangle indicating an input area of the character 4a may be specified based on the position information of the character 4a and an aspect ratio of an image data 5a may be matched with an aspect ratio of the rectangle. By applying the same rule, the image data X2 is deformed into the image data 5b. The image data X3 is deformed into the image data 5c. Further, it may be considered that an area ratio of each rectangle specified with respect to each of the image data X1, X2 and X3 is matched with an area ratio of each of image data 5a, 5b and 5c. By doing this, the operation unit 1b may combine the image data 5a, 5b and 5c obtained by deforming the image data X1, X2 and X3 to generate the image data 5.

The operation unit 1b refers to the character shape data 2 to output the image data of the character associated with the generated image data or the character code associated with the image data. For example, the operation unit 1b outputs an image data X4 of the character associated with the image data 5 or the character code A4 associated with the image data X4. For example, the operation unit 1b may collate the image data 5 with each image data included in the character shape data 2 to specify the image data X4, which is most similar to the image data 5, among the character shape data 2.

In the information processing apparatus 1, the operation unit 1b detects the position information indicating an input position of each of the characters 4a, 4b and 4c that are input through a handwriting input by the user and the character codes A1, A2 and A3 associated with the characters 4a, 4b and 4c, respectively. Further, the operation unit 1b refers to the character shape data 2 to acquire the image data X1, X2 and X3 associated with the character codes A1, A2 and A3 and generate the image data 5 obtained by combining the image data X1, X2 and X3 based on the position information. The operation unit 1b refers to the character shape data 2 to output the image data X4 of the character associated with the image data 5 or the character code A4 associated with the image data X4.

Accordingly, the character unregistered in the dictionary data may be recognized with high accuracy. For example, the dictionary data used for collating with the set of component or the stroke information is prepared in advance for each target character to be recognized in order to perform the character recognition. However, the number of characters is enormous and thus, it is not easy to collect all of characters in the dictionary data.

For example, a preparation work of the dictionary data 3 requires a relatively long time for, for example, registering the stroke information for each character. For example, a stroke disposition pattern or a writing sequence for a single character varies from person to person. Therefore, the preparation of the dictionary data 3 requires a substantial cost for work of, for example, extracting samples, such as an input pattern of the stroke, from multiple users for each character and integrating and editing the extracted samples to be registered. Therefore, registering the character of, for example, a variant character or external character (including a traditional character shape), having a low use frequency in the dictionary data 3 may be omitted. Further, the user himself may prepare a character to register the character in the character shape data 2. It may not be preferable to register the character prepared by user himself in the dictionary data 3 in advance.

Therefore, a method of recognizing the character unregistered in the dictionary data 3 with high accuracy is in question. For example, there may be a case in which the input data 4 is collated with each image data registered in the character shape data 2 when the input data 4, for which the user considered as the character unregistered in the dictionary data 3, is input. However, when the shape as a character of each component included in the input data 4 is collapsed, the recognition accuracy for the input data 4 may be reduced.

The information processing apparatus 1 handles the input data 4 as a combination of a plurality of characters. Specifically, the information processing apparatus 10 recognizes the plurality of characters based on the dictionary data 3 to detect the character codes of the plurality of characters. The information processing apparatus 10 extracts and combines a plurality of image data associated with the plurality of character codes from the character shape data 2 to shape the input data 4 into the image data 5. Also, the information processing apparatus 1 collates the image data 5 with each image data included in the character shape data 2 to specify the image data X4 for the input data 4. Accordingly, even when the character associated with the input data 4 is not registered in the dictionary data 3, the image data X4 or the character code A4 of the character intended to be input by the user may be appropriately specified using the stroke information registered in the dictionary data 3.

In this case, as described above, the information processing apparatus 10 may deform and combine the image data X1, X2 and X3 based on the input positions of the characters 4a, 4b and 4c input by the user in order to generate the image data 5. By doing this, it is possible to reproduce a component input as a Chinese character radical such as "編" or "旁" by the image data X1, X2 and X3 to appropriately reflect the reproduced component in the image data 5.

Second Embodiment

Figure 2:
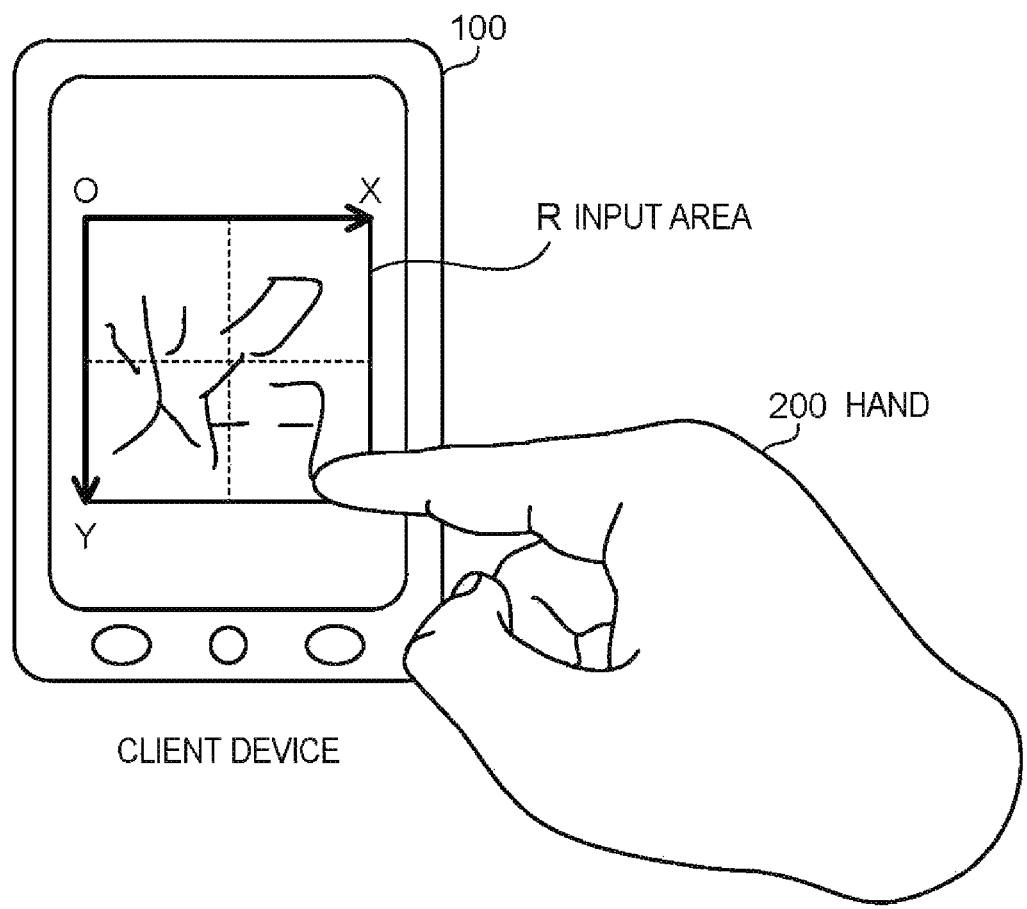
FIG. 2 is a view illustrating a client device of a second embodiment.

FIG. 2 is a view illustrating a client device of a second embodiment. The client device 100 is an information processing apparatus such as a mobile phone, a tablet device or a computer. The client device 100 performs the character recognition. When a handwriting input by the user is received, the client device 100 estimates a character code of a character intended to be input by the user. The client device 100 then utilizes the dictionary data at the time of estimating the character code. The dictionary data is information in which the character code and the stroke information are associated with each other.

For example, the user may perform a handwriting input by overwriting a character on the touch panel provided in the client device 100 by using any finger of a hand 200 or a stylus. For example, the user may input a character through a handwriting input in a predetermined input area R. The client device 100 may present the user with an input area in such a manner that the input area R is displayed on a display as an input area for inputting the character. In the following description, an apex of upper left of the input area R which orients the ground surface is defined as the origin of coordinates "O". Further, a coordinate axis of the right direction with respect to the origin of coordinates "O" is defined as X-axis and a coordinate axis of the down direction with respect to the origin of coordinates "O" is defined as Y-axis.

For example, the client device 100 displays the image data of the character associated with the estimated character code on the display. For example, when the image data of the character displayed on the display is the data intended to be input by the user, the user may determine an input of the character for manipulation.

Figure 3:
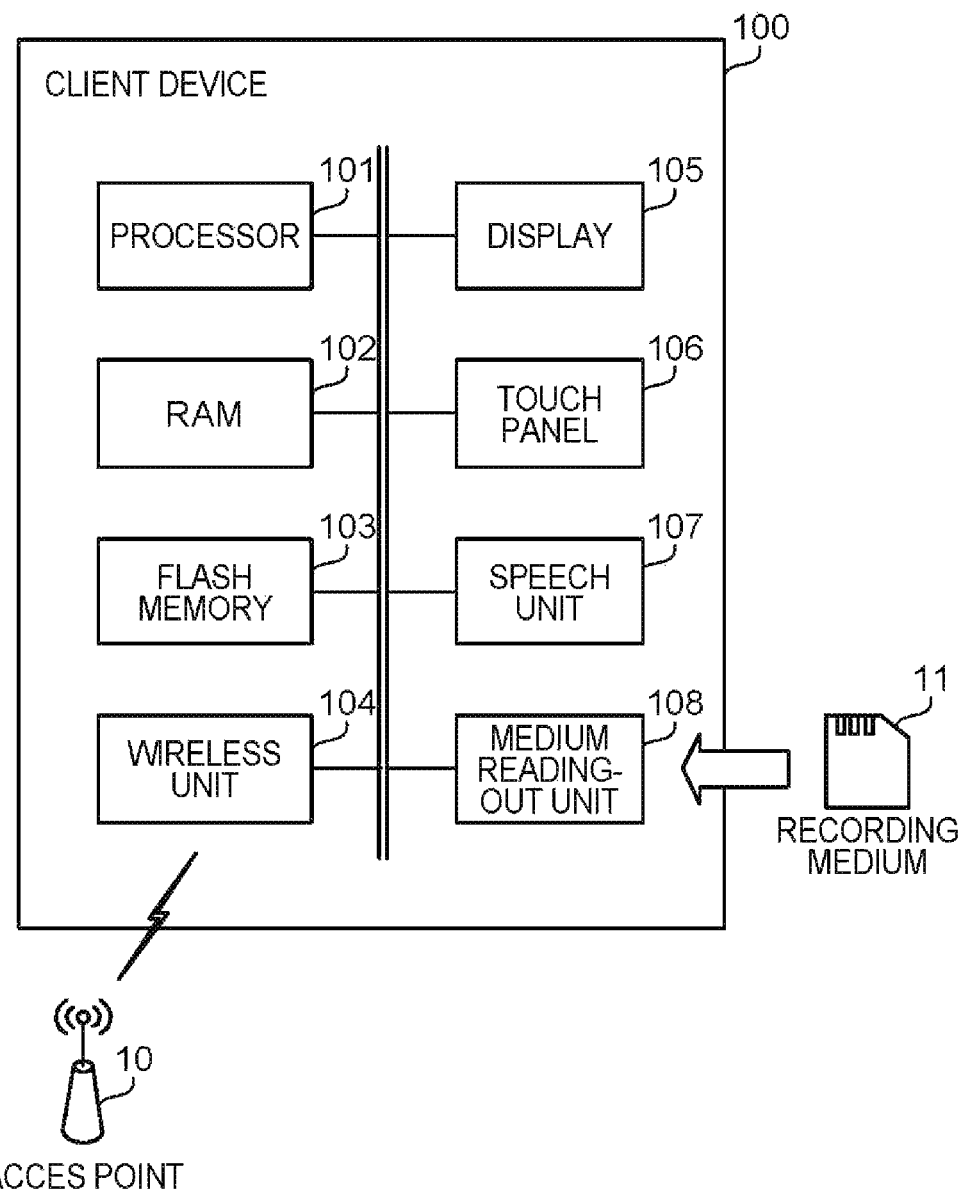
FIG. 3 is a view illustrating an example of hardware of the client device.

FIG. 3 is a view illustrating an example of hardware of the client device 100. The client device 100 includes a processor 101, RAM 102, a flash memory 103, a wireless unit 104, a display 105, a touch panel 106, a speech unit 107 and a medium reading-out unit 108. The respective units are connected to a bus of the client device 100.

The processor 101 controls the information processing of the client device 100. The processor 101 may be, for example, a CPU, DSP, ASIC or FPGA. The processor 101 may be a multi-processor as well. The processor 101 may be a combination of two or more components, such as the CPU, DSP, ASIC or FPGA.

The RAM 102 is a main storage device of the client device 100. The RAM 102 temporarily stores at least a portion of OS (Operating System) program or an application program executed by the processor 101. Further, the RAM 102 stores various data used for processing executed by the processor 101.

The flash memory 103 is an auxiliary storage device of the client device 100. The flash memory 103 stores, for example, the OS program, the application program or various data therein. The flash memory 103 may be a portable recording medium detachable to the client device 100.

The wireless unit 104 is an interface capable of performing a wireless communication. The wireless unit 104 may communicate with an access point 10 to access a network to which the access point 10 is connected. The wireless unit 104 may transmit and receive a program or data to and from the other computer connected to the network. Further, the client device 100 may be provided with an interface capable of wired communication, either instead of the wireless unit 104 or together with the wireless unit.

The display 105 outputs an image according to an instruction issued from the processor 101. For example, the display 105 may be a liquid crystal display or an EL (Electro Luminescence) display.

The touch panel 106 detects the touch manipulation by, for example, a user. The user may touch the touch panel 106 using a finger or a stylus pen. When the touch manipulation is detected, the touch panel 106 detects the position on which the finger or stylus pen contacts and outputs the position to the processor 101. When the overwriting manipulation is performed on the touch panel 106 by the finger or stylus pen, the touch panel 106 continuously detects the position included on a locus and outputs the detected position to the processor 101.

Further, the touch panel 106 may be an external device connected to the client device 100. Further, the client device 100 may be connected to other pointing device, such as a touch pad or a mouse, to receive a handwriting input using the other pointing device.

The speech unit 107 implements a calling function. For example, the speech unit 107 is provided with a microphone or a speaker. The speech unit 107 performs a signal conversion process on a voice analog signal input by the microphone to generate and output voice data to the processor 101. Further, the speech unit 107 converts the voice data acquired from the processor 101 into voice analog signal and outputs a voice using the speaker.

The medium reading-out unit 108 may read the program or data from the portable recording medium 11, or records the program or data onto the recording medium 11 according to an instruction issued from the processor 101. For example, the recording medium 11 is a detachable card-type recording medium (e.g., a memory card) to the medium reading-out unit 108. The medium reading-out unit 108 stores the program or data read from the recording medium 11 in the RAM 102 or the flash memory 103. The medium reading-out unit 108 may be a driving device which reads the program or data recorded in an optical disk using, for example, laser light (e.g., in a case where the client device 100 is a computer).

In such a case, an optical disk may be used as the recording medium 11. For example, a DVD (Digital Versatile Disc), DVD-RAM, CD-ROM (Compact Disc Read Only Memory), CD-R (Recordable)/RW (ReWritable) may be used as the optical disk. For example, the medium reading-out unit 108 stores the program or data read from the optical disk in the RAM 102 or the flash memory 103 (or other storage device such as a HDD) according to the instruction issued from the processor 101.

Figure 4:
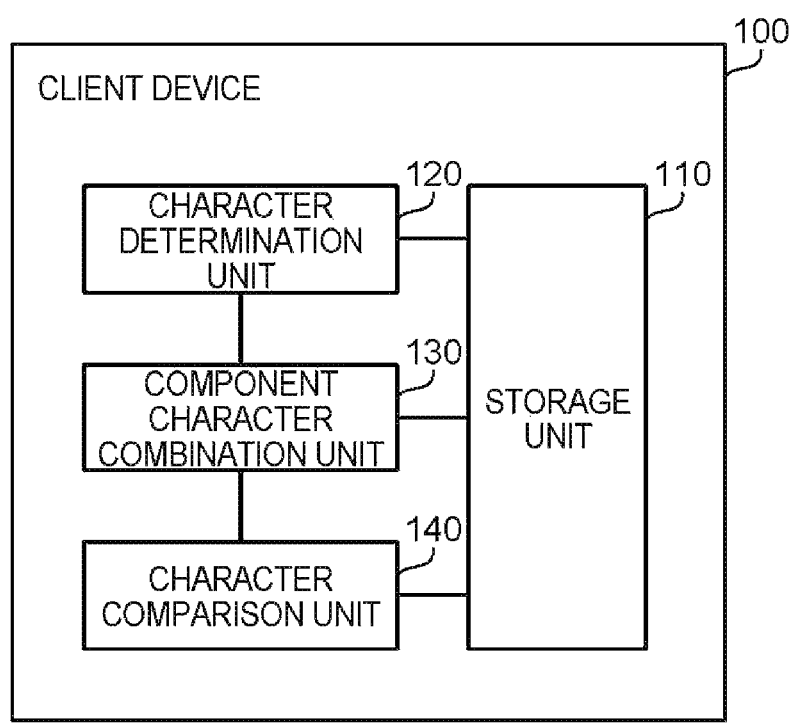
FIG. 4 is a view illustrating an example of functionality of the client device.

FIG. 4 is a view illustrating an example of functionality of the client device 100. The client device 100 includes, for example, a storage unit 110, a character determination unit 120, a component character combination unit 130 and a character comparison unit 140. The storage unit 110 may be implemented by a storage area secured in the RAM 102 or the flash memory 103. The character determination unit 120, the component character combination unit 130 and the character comparison unit 140 may be implemented by a software module executed by the processor 101.

The storage unit 110 stores various information used for the processing performed by the character determination unit 120, the component character combination unit 130 and the character comparison unit 140. The information stored in the storage unit 10 includes a character shape table, a dictionary table, an input history table, a similarity history table and a combination table.

The character shape table is a table which indicates association relationship between a character code and a character font (e.g., an image data representing a character shape). The dictionary table is a table which indicates an association relationship between the character code and reference stroke information. The input history table is a table which stores information about a stroke input. The similarity history table is a table which stores a calculation history of a similarity between the stroke input in handwriting and the stroke information. The combination table is a table used for combining the image data.

The character determination unit 120 receives a handwriting input by the user. The character determination unit 120 stores a group of coordinates which indicates a locus associated with each stroke detected by the touch panel 106 in the input history table stored in the storage unit 110. The character determination unit 120 specifies a single character input in handwriting depending on whether a time period during which any stroke is not input after the last stroke is input is continued for a predetermined time.

The character determination unit 120 estimates a character which is input based on information of the handwriting input and specifies the character code associated with the character. The character determination unit 120 may specify the character code according to the information of the handwriting input based on the character shape table and the dictionary table stored in the storage unit. For example, a case where the character recognition is performed on the character registered in the dictionary table.

The character determination unit 120 receives a single stroke input in handwriting. The character determination unit 120 compares each stroke information registered in the dictionary table with the stroke information which is input in handwriting to evaluate a first similarity of the stroke information. Here, the similarity is displayed in a numerical value. Also, it is assumed that similarity becomes higher as the numerical value of the similarity becomes larger, and non-similarity becomes higher as the numerical value of the similarity becomes smaller. The character determination unit 120 may extract one or plural character codes associated with the stroke information having the first similarity with a large numerical value from the dictionary table.

Further, the character determination unit 120 compares each image data registered in the character shape table with an image data which is input in handwriting to evaluate a second similarity of an image pattern. For example, when the character is represented by a dot pattern having a binary value, the second similarity may be calculated by a matching degree between dot positions or dot patterns. The character determination unit 120 may extract one or plural character codes associated with the image data having the second similarity with a large numerical value from the character shape table.

Also, the character determination unit 120 specifies the character code for the handwriting input among the character codes extracted from the character shape table and the dictionary table. Specifically, the character determination unit 120 calculates a similarity by comprehensively determining results obtained as the first similarity and second similarity and specifies the character code which becomes to have the maximum similarity among the candidates for the character codes. For example, the character determination unit 120 may calculate a comprehensive similarity of each character code by averaging the first similarity and second similarity for the same the character code. However, the character determination unit 120 may specify the character code for the handwriting input using only the first similarity (calculation of the second similarity may be omitted).

In the meantime, the user may intend to input a character, which is considered as the character unregistered in the dictionary data 3, to perform a handwriting input. Accordingly, the character determination unit 120 calculates the similarity each time when a single stroke is input in a time period until the last stroke of a single character is input after a first stroke of the single character is input. Specifically, the character determination unit 120 handles the character which is not registered in the dictionary table as a combination of a plurality of sub-characters (e.g., hereinafter, the plurality of sub-characters may be referred to as component character) and performs the character recognition for each of the plurality of component characters. As will be described below, the character determination unit 120 detects a single component character through detection of the change of similarity. When a plurality of component characters are detected during an input period of a single character, the character determination unit 120 outputs each character code of each component character to the component character combination unit 130.

The component character combination unit 130 acquires the image data of each component character from the character shape table based on the character codes of the plurality of component characters acquired from the character determination unit 120. The component character combination unit 130 combines the image data of each acquired component character based on the position information which indicates a position at which each component character is input. The component character combination unit 130 may specify the position information of each component character from the stroke input history stored in the storage unit 110.

The component character combination unit 130 specifies a rectangle indicating an area in which each component character is input based on the position information. The component character combination unit 130 deforms the image data of each component character to be fitted into each rectangle to combine each component character (description e.g., hereinafter, the image data after deformation may be referred to as deformed image data). Also, the component character combination unit 130 generates and outputs a single image data (e.g., hereinafter, the single image data may be referred to as composite image data) to the character comparison unit 140 as a combination result.

The character comparison unit 140 acquires the composite image data from the component character combination unit 130. The character comparison unit 140 collates the each image data of the character shape table stored in the storage unit 110 with the composite image data to specify and output the image data associated with the composite image data or the character code associated with the image data. For example, the character comparison unit 140 may display the image data associated with the composite image data on the display 105. Further, the character comparison unit 140 may output the character code associated with the image data to, for example, predetermined software that runs on the client device 100 or other device that communicates with the client device 100.

FIG. 5 is a view illustrating an example of a character shape table 11. The character shape table 111 is stored in the storage unit 110 in advance. The character shape table 111 may be information of the character font provided by the operating system of the client device 100. Otherwise, the character shape table 111 may be information prepared by the character determination unit 120 using the information of the character font (e.g., by replicating the information of the character font).

The character shape table 111 includes a character code field and an image data field. The character code is registered in the character code field. The image data (e.g., bitmap data) indicating the character font is registered in the image data field.

For example, information indicating that the character code is "706b" and the image data is "G1 (火)" is registered in the character shape table 111. This indicates that the image data "G1" which indicates the character "火" for the character code "706b" has been registered.

The contents registered in the character shape table 111 may be added by the user. For example, the user may register a variant character or an external character in the character shape table 111 by associating the variant character or external character with an unused character code. Further, the user may also prepare an image data of his own character and associate the image data with an unused character code to be registered in the character shape table 111. For example, the image data "G7" of the variant character for the character code "7130" is registered in the character shape table 111. The image data "G7" is a character font of a variant character of the character "焔".

Further, unicode is exemplified as an example of the character code, but other character codes (e.g., a JIS code or Shift JIS code) may be used in the second embodiment as well.

FIG. 6 is a view illustrating an example of a dictionary table 112. The dictionary table 112 is stored in the storage unit 110 in advance. The dictionary table 112 includes a character code field and a stroke information field. The character code is registered in the character code field. The reference stroke information is registered in the stroke information field. For example, the stroke information may include a plurality of patterns, such as a writing start position and writing completion position of each stroke, a relative positional relationship between the writing completion position of each stroke and the a writing start position of the next stroke, or a writing sequence which forms the single character, for a single character.

For example, information indicating that the character code is "30bd" and the stroke information is "P1" is registered in the dictionary table 112. For example, the stroke information about the variant character of the character "焔" is not registered in the dictionary table 112.

Figure 7:
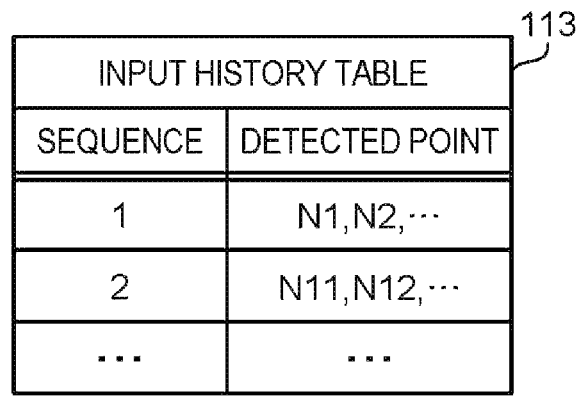
FIG. 7 is a view illustrating an example of an input history table.

FIG. 7 is a view illustrating an example of an input history table 113. The input history table 113 is stored in the storage unit 110. The input history table 113 includes a sequence field and a detected point field. An input sequence of stroke is registered in the sequence field. A group of coordinates on the stroke input by the user are registered in the detected point field. For example, information that the sequence is "1" and the detected points are "N1, N2, . . . " is registered in the input history table 113. This indicates that the coordinates "N1, N2, . . . " are detected about a first stroke input.

The input sequence of stroke may be specified by the sequence registered in the input history table 113. Further, the relative positional relationship between respective strokes may be specified from the last detected point of a certain stroke and a first detected point of the next stroke. A set of a plurality of strokes, that are input continuously, registered in the input history table 113 forms a single character (or a single component character).

FIG. 8 is a view illustrating an example of a similarity history table 114. The similarity history table 114 is stored in the storage unit 110. A new entry is added in the similarity history table 114 each time when a single stroke is input by the user. The content registered in the similarity history table 114 is cleared when a single component character is detected. The similarity history table 114 includes the number of input strokes field, the character code field and a similarity field.

The number of input strokes (e.g., the number of strokes per a component character) is registered in the number of input strokes field. The character code is registered in the character code field. A similarity evaluated by the character determination unit 120 for a handwriting input by the user is registered in the similarity field. Here, as an example, the maximum similarity value is set as "100".

For example, information indicating that the number of input strokes is "1", the character code is "30bd", and the similarity is "17" is registered in the similarity history table 114. This indicates that the character code "30bd" was detected for the first stroke and the similarity at that time was "17".

Further, for example, information indicating that the number of input strokes is "2", the character code is "706b", and the similarity is "53" is registered in the similarity history table 114. This indicates that the character code "706b" was detected for a combination of the first stroke and second stroke and the similarity at that time was "53".

FIG. 9 is a view illustrating an example of a combination table 115. The combination table 115 is stored in the storage unit 110. The combination table 115 includes a character code field, a deformed image data field, a minimum coordinate field and a maximum coordinate field.

The character code is registered in the character code field. The deformed image data of the component character is registered in the deformed image data field. A pair of the minimum coordinates (referred to as minimum coordinate) of X-axis and Y-axis detected for the component character is registered in the minimum coordinate field. A pair of the maximum coordinates (referred to as maximum coordinate) of X-axis and Y-axis detected for the component character is registered in the maximum coordinate field.

For example, information indicating that the character code is "706b", the deformed image data is "G11", the minimum coordinate is "(3, 25)", and the maximum coordinate is "(42 78)" is registered in the combination table 115. This indicates that the deformed image data "G11" is generated for the character code "706b". Further, this indicates that the minimum coordinate was "(3, 25)" and the maximum coordinate was "(42 78)" at the time when the component character associated with the character code was input. Further, the minimum coordinate and the maximum coordinate may also be used as information (e.g., information indicating a relative positional relationship with other deformed image data) for determining a position at which the deformed image data is placed.

Figure 10:
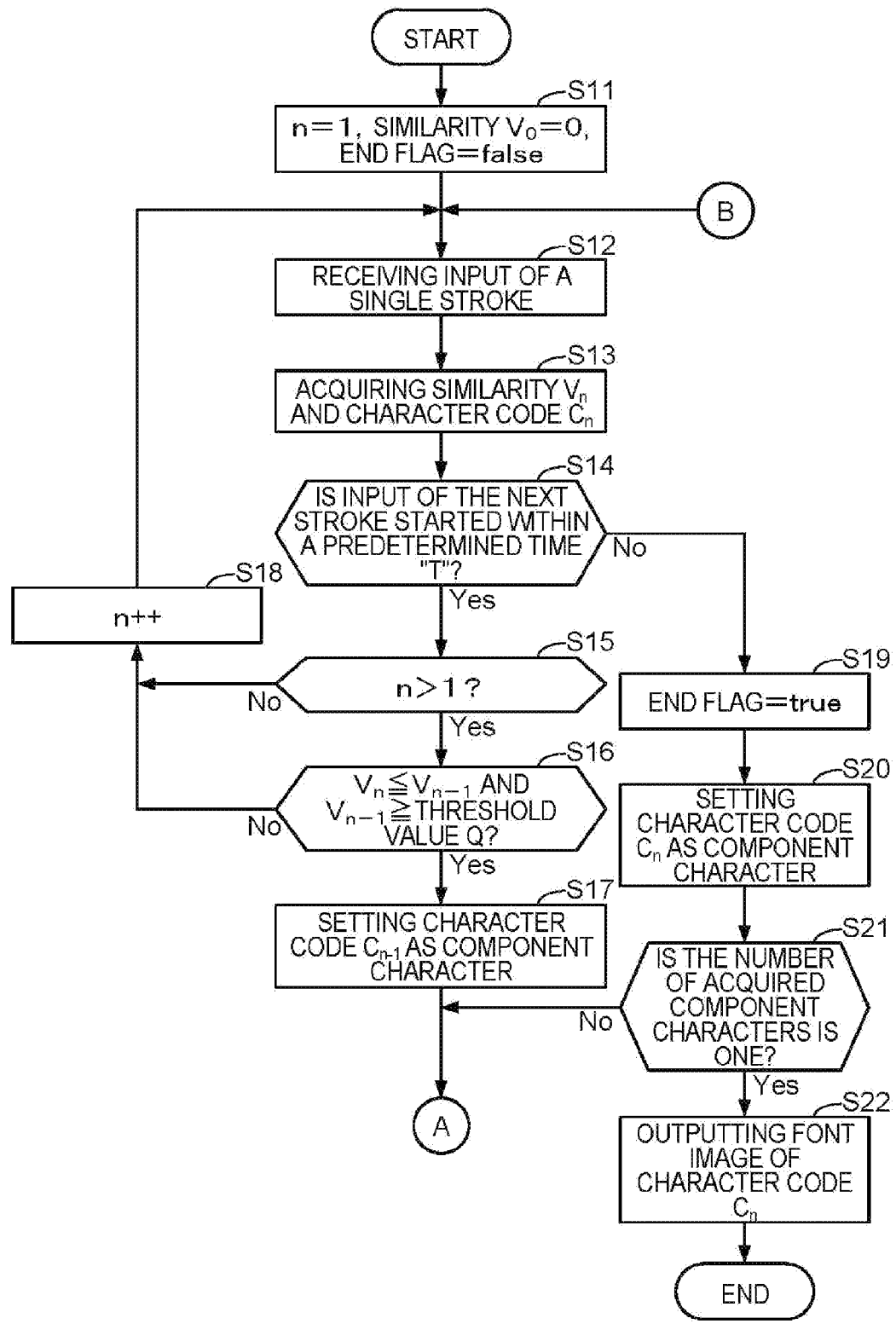
FIG. 10 is a flowchart illustrating an example of a character recognition process.

FIG. 10 is a flowchart illustrating an example of a character recognition process. Hereinafter, a process indicated in FIG. 10 will be described according to the step numbers. The character determination unit 120 receives manipulating input by the user indicating that the character recognition starts. The character determination unit 120 substitutes the number "1" into a variable "n", sets a similarity V0 as "0" and sets an end flag as "false", respectively (S11).

The character determination unit 120 receives a single stroke of a handwriting input by the user (S12). The expression of "receiving a single stroke" means that the writing completion point of the single stroke is detected. The character determination unit 120 stores information indicating the input strokes (e.g., a group of coordinates indicating a locus of strokes detected by the touch panel 106) in the storage unit 110.

The character determination unit 120 extracts a set of strokes (e.g., referred to as a group of undecided strokes), that has not yet been decided to form which character, from the input history table 113 stored in the storage unit 110 (S13). The character determination unit 120 calculates a similarity Vn between the group of undecided strokes and each character based on the group of undecided strokes and the character shape table 111 and the dictionary table 112 stored in the storage unit 110. For example, the character determination unit 120 collates the group of undecided strokes with each stroke information of the dictionary table 112 to calculate a first similarity between the group of undecided strokes and each character. Further, the character determination unit 120 collates dot patterns represented by the group of undecided strokes and the image data of the character shape table 111 to calculate a second similarity between the group of undecided strokes and each character. Also, the character determination unit 120 comprehensively determines a similarity between the group of undecided strokes and each character based on the first similarity and the second similarity. For example, as described above, an average of the first similarity and the second similarity may be set as the similarity between the group of undecided strokes and each character. Also, the maximum similarity is set as Vn and the character code associated with the similarity Vn is set as a character code Cn. The character determination unit 120 registers the number of input strokes "n", the character code Cn and the similarity Vn in the similarity history table 114.

The character determination unit 120 determines whether an input of the next stroke (e.g., next line made by a single movement in handwriting) is started within a predetermined limitation time "T" after receiving the input of the stroke at step S12 (S14). The expression of "Input of the next stroke is started" means that the writing start point of the next stroke is detected. When it is determined that the next stroke is started within the limitation time "T", the process proceeds to step S15. When it is determined that the next stroke is not started within the limitation time "T", the process proceeds to step S19. For example, the limitation time "T" may be set as an arbitrary time period on the sequence of from 0.2 seconds to 1 second. The limitation time "T" may be allowed to change a set time into a time period according to an input method of the user.

The character determination unit 120 determines whether the variable "n" is larger than "1" (S15). When it is determined that the "n" is larger than "1", the process proceeds to step S16. Otherwise, when the "n" is "1" or less, the process proceeds to step S18.

The character determination unit 120 determines whether the similarity Vn is the similarity Vn−1 or less and the similarity Vn−1 is a threshold value Q or more (S15). When it is determined that the similarity Vn is the similarity Vn−1 or less and the similarity Vn−1 is the threshold value Q or more, the process proceeds to step S17. When it is determined that the similarity Vn is larger than the similarity Vn−1 and the similarity Vn−1 is less than the threshold value Q, the process proceeds to step S18.

The character determination unit 120 specifies the character code Cn−1 as the component character (S17). The character determination unit 120 registers the character code Cn−1 in the combination table 115 stored in the storage unit 110. The character determination unit 120 outputs the character code Cn−1 to the component character combination unit 130, and the process proceeds to step S31 of FIG. 11.

The character determination unit 120 increases the variable "n" by one (adds one to the value of the "n") (S18), and the process proceeds to step S12. The character determination unit 120 sets the end flag as "true" (S19).

The character determination unit 120 specifies the character code Cn as the component character (S20). The character determination unit 120 registers the character code Cn in the combination table 115. The character determination unit 120 refers to the combination table 115 to determine whether the number of the acquired component character is one (S21). When it is determined that the number of the acquired component character is one, the process proceeds to step S22. Otherwise, when the number of the acquired component character is not one, the character determination unit 120 outputs the character code Cn to the component character combination unit 130, and the process proceeds to step S31 of FIG. 11.

The character determination unit 120 acquires the image data of the character code Cn, that corresponds to a character code acquired only, output from the character shape table 111 and outputs the acquired image data to the display 105 (S22). Otherwise, the character determination unit 120 may output the character code Cn to other software or device. For example, the user may browse an image of character displayed in the display 105 to identify whether the character is a character intended to be input of his own. The character determination unit 120 clears the content of each table for the recognition of the next character, and also ends the recognition process of a single character.

Further, as described above, the similarity Vn and the character code Cn may be acquired by only using the result of collation with the dictionary table 112 at step S13. Further, an input of a first stroke of the character mostly corresponds to a line, such as a horizontal line "-" or a vertical line "|" and thus, a similarity between the character and a character "-" is calculated to be larger. Therefore, when the similarity is greatly reduced in the second stroke, the determination result of step S16 becomes affirmative so that the component character may be erroneously detected. Accordingly, the determination of step S16 is not performed in a case of the first stroke as in step S15 and thus, the possibility that the component character is erroneously detected may be reduced.

Figure 11:
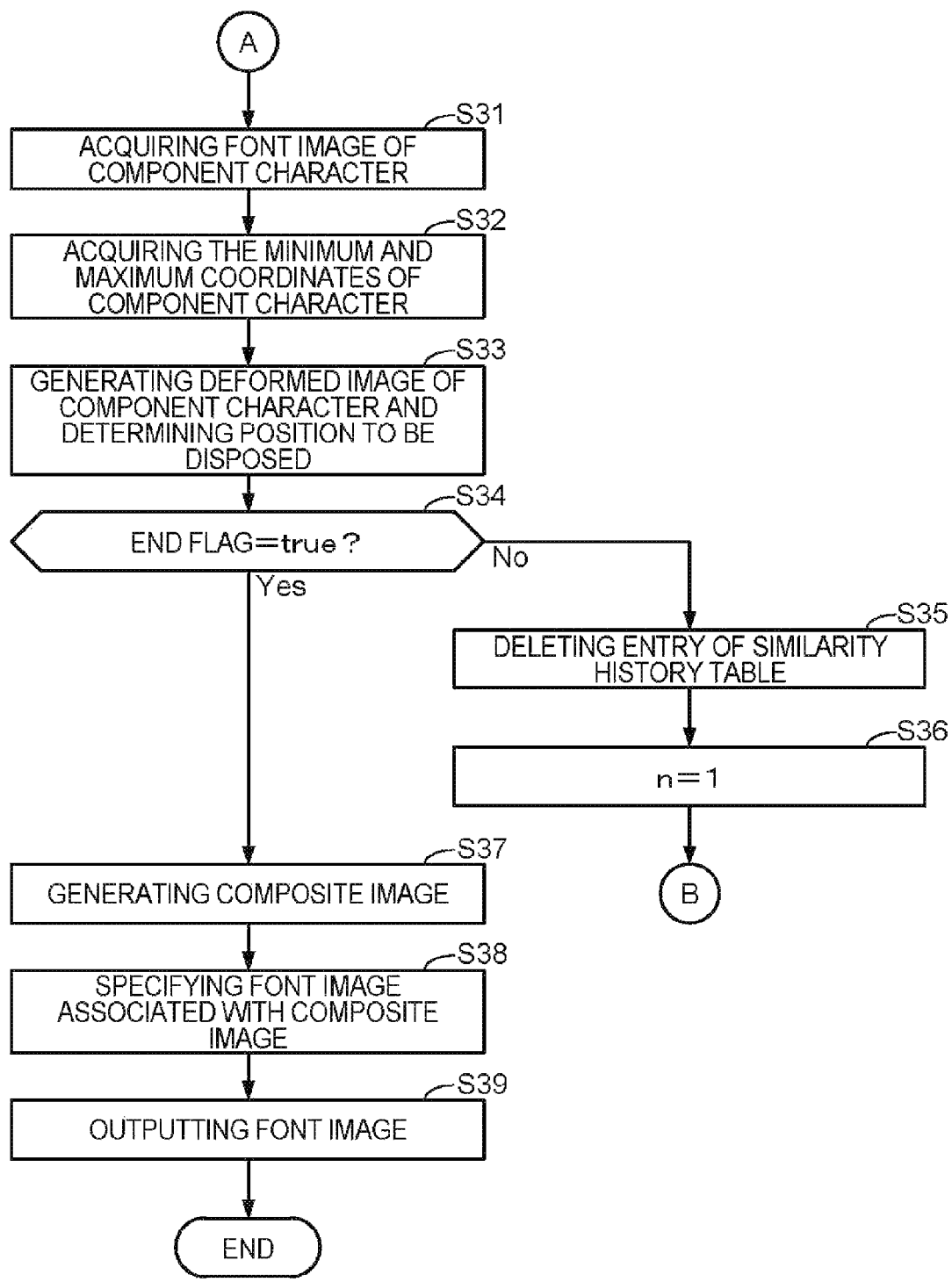
FIG. 11 is a flowchart illustrating the (continued) example of the character recognition process.

FIG. 11 is a flowchart illustrating the example of the character recognition process (continued from FIG. 10). Hereinafter, a process illustrated in FIG. 11 will be described according to the step numbers. The component character combination unit 130 refers to the character shape table 111 to acquire the image data (font image) associated with the character code Cn−1 of the component character acquired at step S17 (S31). Otherwise, the component character combination unit 130 acquires the image data associated with the character code Cn of the component character acquired at step S20.

The component character combination unit 130 refers to the input history table 113 stored in the storage unit 110 regarding the component character detected at step S17 or step S20 to acquire the minimum coordinate and the maximum coordinate from the coordinates of the input component character (S32). The component character combination unit 130 registers the minimum coordinate and the maximum coordinate of the component character in the combination table 115.

The component character combination unit 130 specifies a rectangle having the minimum coordinate and maximum coordinate acquired at step S32 as a pair of diagonally opposed apex (e.g., two apex not sharing a side). Two sides of the rectangle are parallel with X-axis and other two sides are parallel with Y-axis. The component character combination unit 130 deforms the image data of the component character acquired at step S31 to be fitted into the rectangle to generate the deformed image data. Specifically, the component character combination unit 130 changes (extends and retracts) lengths of the original image data in X-axis direction and Y-axis direction such that a size of the original image data of the component character becomes the same size as the size of the rectangle. That is, an aspect ratio of the deformed image data becomes the same ratio as an aspect ratio of the rectangle. Further, the size of the original image data may not be necessarily the same size, and may be a size which allows a predetermined margin that amounts to a larger or smaller size by a predetermined ratio than the size of the rectangle about an aspect. Further, the component character combination unit 130 determines the position of the deformed image data to be disposed such that the apex of the generated deformed image data are matched with the corresponding apex of the rectangle (S33). The component character combination unit 130 registers the deformed image data of the component character in the combination table 115.

The component character combination unit 130 determines whether the end flag is "true" (S34). When it is determined that the end flag is "true", the process proceeds to step S37. Otherwise, when the end flag is not the "true" (that is, the end flag remains in "false"), a process control is transferred to the character determination unit 120, and the process proceeds to step S35.

The character determination unit 120 deletes the entry of the similarity history table 114 (S35). The character determination unit 120 substitutes "1" into the variable "n" (S36), and the process proceeds to step S12 of FIG. 10. That is, the process proceeds to processing for detecting the next component character.

The component character combination unit 130 disposes and combines each deformed image data stored in the combination table 115 on a position determined at step S33 to generate a composite image data. The component character combination unit 130 outputs the composite image data to the character comparison unit 140 (S37).

The character comparison unit 140 refers to the character shape table 111 to retrieve an image data (e.g. a font image) of the character font associated with the acquired composite image data. For example, the character comparison unit 140 may detect a Chinese character radical included in the composite image data to narrow down the image data of the character shape table 111 by the Chinese character radical. The character comparison unit 140 calculates a matching degree of a dot position or dot pattern between the composite image data and each image data registered in the character shape table 111 as a similarity and specifies the image data having the maximum similarity as an image data associated with the composite image data (S38).

The character comparison unit 140 outputs the image data specified at step S38 to the display 105 (S39). Otherwise, the character comparison unit 140 may acquire the character code associated with the image data from the character shape table 111 to output the acquired character code to other software or other device. For example, the user may browse the character image displayed in the display 105 to identify whether the character image corresponds to a character intended to be input by the user. The character comparison unit 140 clears the contents of the similarity history table 114 and the combination table 115 for recognition of the next character. Then, the recognition process of a single character ends.

Further, step S33 may be executed immediately before step S37. In this case, step S34 is executed after step S32, and when a determination result at step S34 is "YES", step S33 is executed.

Next, a specific example of a processing by the character determination unit 120 will be described. In the following description, a case of recognizing a variant character of the character " 焔 " is exemplified. In the following description, when referring to the number of input strokes, the number of input strokes is denoted as the number of strokes (e.g., a total of 12 (twelve) strokes exist in the following example) of an entirety of the variant character. Further, the threshold value Q of similarity is set to "80" as an example.

Figure 12A:
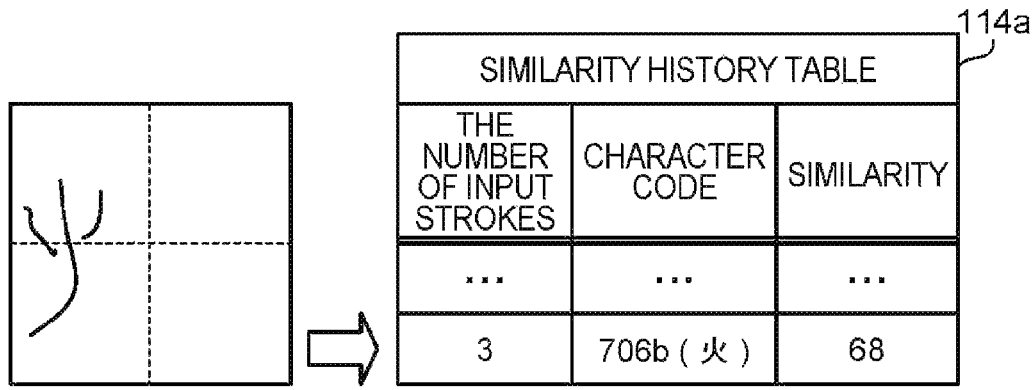
FIGS. 12A-12C are views illustrating a specific example of a component character determination.
Figure 12B:
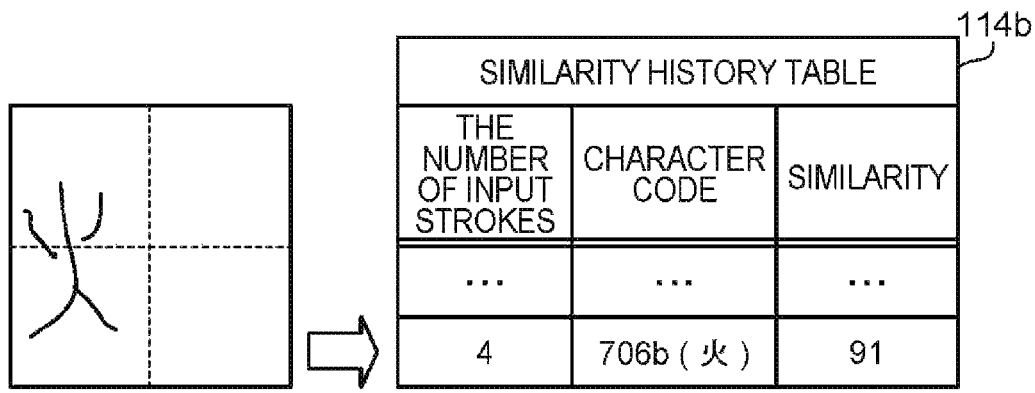
Figure 12C:
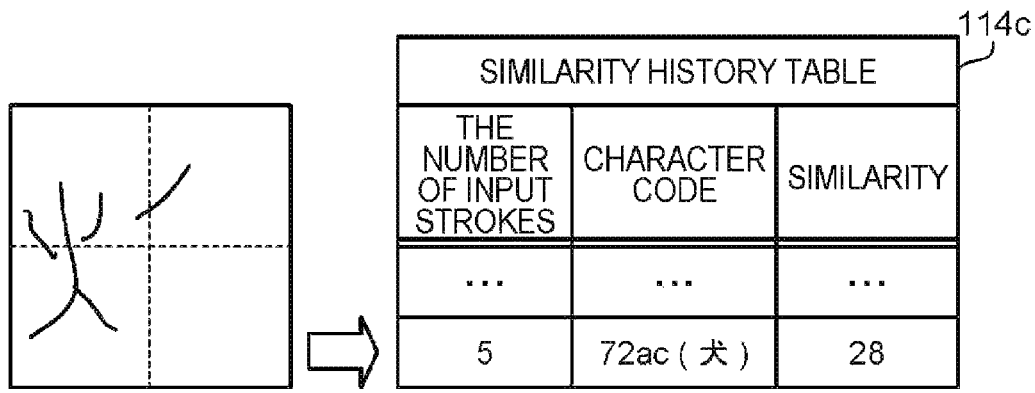

FIGS. 12A, 12B and 12C are views illustrating a specific example of a component character determination. FIG. 12A exemplifies the similarity history table 114a for a case where a third stroke input is received. The character determination unit 120 registers an entry that the number of input strokes is "3", the character code is "706b" (associated with the character "火") and the similarity is "68" in the similarity history table 114a. Here, only the latest entry is denoted and other entries are abbreviated as " . . . " (hereinafter, it may be similarly denoted).

FIG. 12B exemplifies the similarity history table 114b for a case where a fourth stroke input is received. The character determination unit 120 registers an entry that the number of input is strokes "4", the character code is "706b" (associated with the character "火") and the similarity is "91" in the similarity history table 114b.

FIG. 12C exemplifies the similarity history table 114c for a case where a fifth stroke input is received. The character determination unit 120 registers an entry that the number of input strokes is "5", the character code is "72ac" (associated with the character "犬") and the similarity is "28" in the similarity history table 114c. Here, when comparing the similarity history tables 114b and 114c with each other, the similarity V5=28 falls within a range which is equal to or less than the similarity V4=91. Further, the similarity V4=91 amounts to a range which is equal to or larger than the threshold value Q=80. Accordingly, the character determination unit 120 detects the input image obtained by the strokes input as indicated in FIG. 12B as a single component character. The character code of the component character is "706b". The character determination unit 120 clears the registration contents in the similarity history table 114c.

Figure 13A:
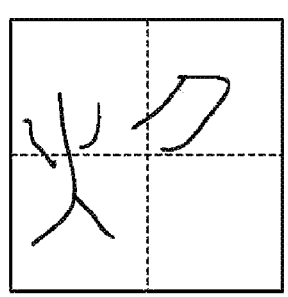
FIGS. 13A-13D are views illustrating the (continued) specific example of the component character determination.
Figure 13B:
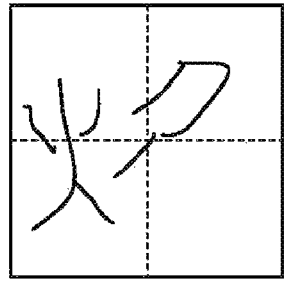
Figure 13C:
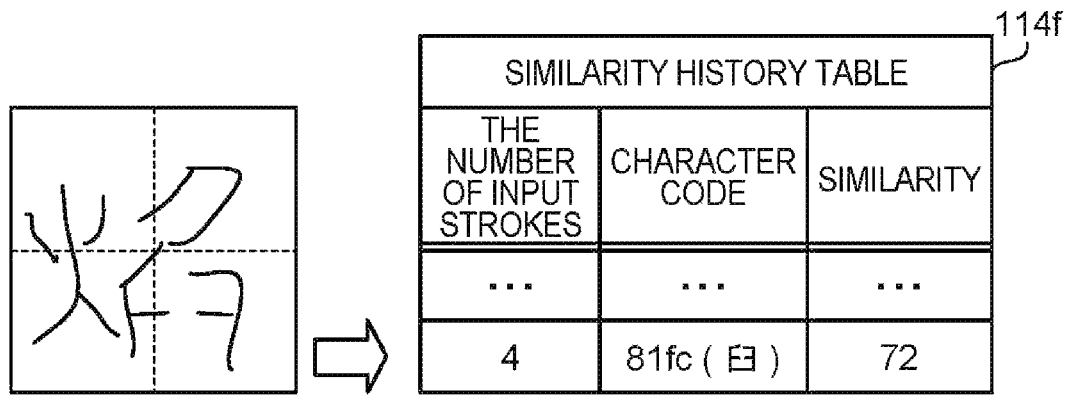

FIGS. 13A, 13B and 13C are views illustrating the specific example of the component character determination (continued from FIG. 12). FIG. 13A exemplifies the similarity history table 114d for a case where a sixth stroke (since the similarity history table 114 is cleared, the stroke becomes a first stroke for management) input of FIG. 12C is received. The character determination unit 120 registers an entry that the number of input strokes is "1", the character code is "30af" (associated with the character "ク") and the similarity is "86" in the similarity history table 114d.

FIG. 13B exemplifies the similarity history table 114e for a case where a seventh stroke input is received. The character determination unit 120 registers an entry that the number of input strokes is "2", the character code is "ff17" (associated with the character "7") and the similarity is "39" in the similarity history table 114e. Here, when comparing the similarity history tables 114d and 114e with each other, the similarity V5=39 falls within a range which is equal to or less than the similarity V4=86. Further, the similarity V1=86 amounts to a range which is equal to or larger than the threshold value Q=80. Accordingly, the character determination unit 120 detects the input image obtained by the strokes input as indicated in FIG. 13A as a single component character. The character code of the component character is "30af". The character determination unit 120 clears the content registered in the similarity history table 114e.

FIG. 13C exemplifies the similarity history table 114f for a case where an eleventh stroke input is received. The character determination unit 120 registers an entry that the number of input strokes is "4", the character code is "81fc" (associated with the character "臼") and the similarity is "72" in the similarity history table 114f.

Figure 13D:
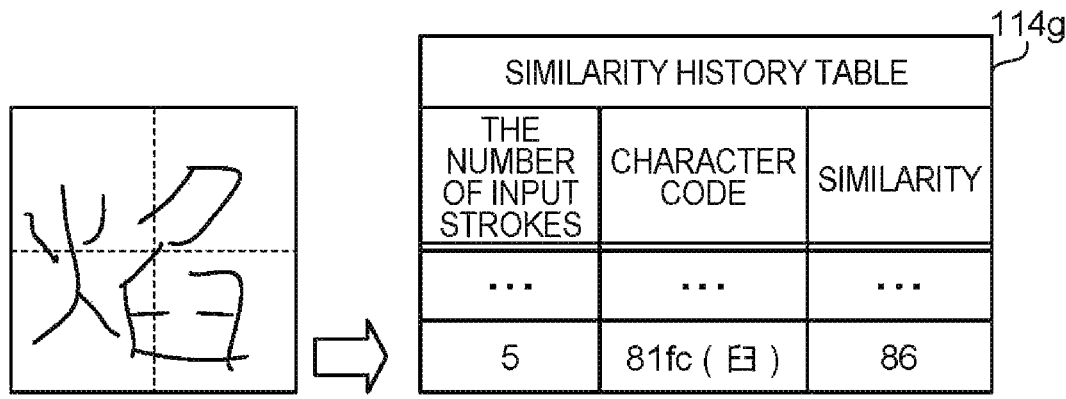

FIG. 13D exemplifies the similarity history table 114g for a case where a twelfth stroke input is received. The character determination unit 120 registers an entry that the number of input strokes is "5", the character code is "81fc" (associated with the character "臼") and the similarity is "86" in the similarity history table 114f. The character determination unit 120 detects the input image obtained by the strokes input obtained by performing input a dozen times as a single component character when the next input is not started after detecting the twelfth stroke input. The component character combination unit 130 deforms and combines the image data of each component character detected by the character determination unit 120 to generate the composite image data. Next, a deformation process of the image data by the component character combination unit 130 will be exemplified.

Figure 14:
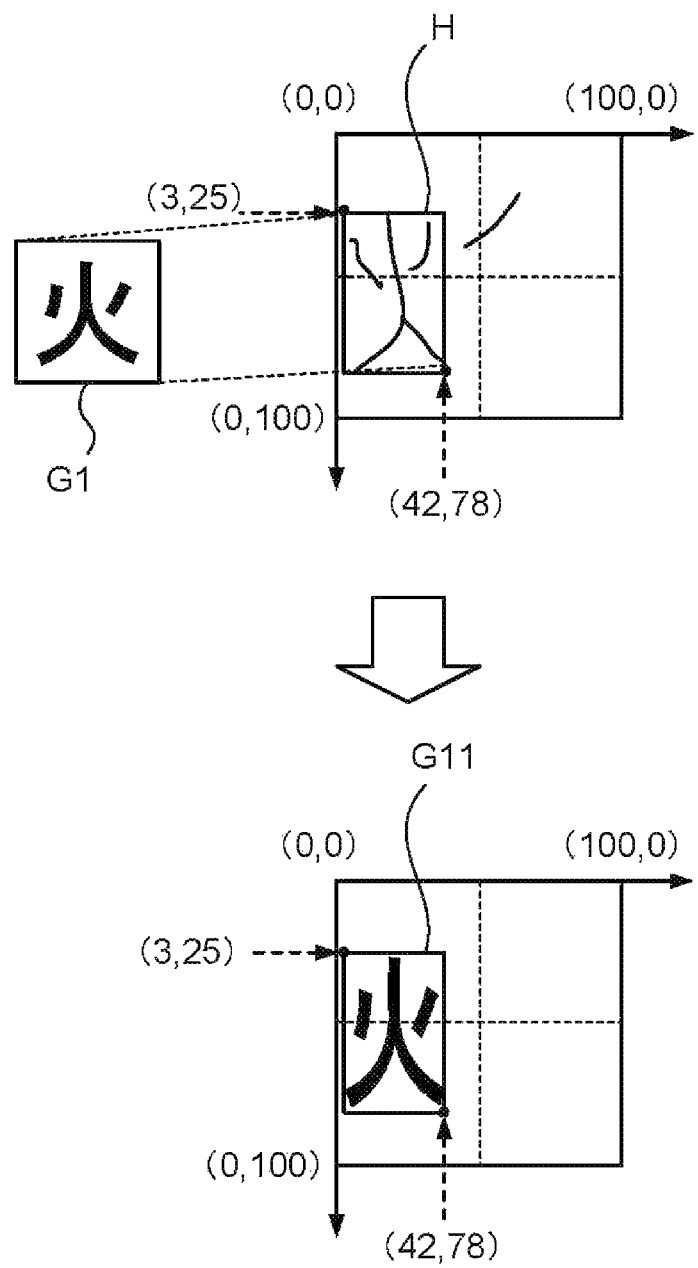
FIG. 14 is a view illustrating an example of a deformed image data.

FIG. 14 is a view illustrating an example of a deformed image data. The component character combination unit 130 refers to the character shape table 111 to acquire the image data G1 associated with the character code "706b" of the component character (e.g., the character "火"). Further, the component character combination unit 130 acquires the minimum coordinate "(3, 25)" and the maximum coordinates "(42, 78)" from an input history up to the fourth stroke of FIG. 12B. Further, it is assumed that the maximum value of X-axis is "100" and the maximum value of Y-axis is "100" of the input area "R" in the example FIG. 14.

The component character combination unit 130 specifies the rectangle "H" having the minimum coordinate and the maximum coordinate as the diagonally opposed apex. Two sides of the rectangle "H" in a horizontal direction are parallel with X-axis. Two sides of the rectangle "H" in a vertical direction are parallel with Y-axis. Also, the image data G1 is deformed such that the image data G1 may be disposed to be fitted into the rectangle "H". Specifically, a length in a direction parallel with X-axis of the image data G1 is extended and retracted to be the same as the length of the horizontal side (e.g., "39") of the rectangle "H". Further, a length in a direction parallel with Y-axis of the image data G1 is extended and retracted to be the same as the length of the vertical side (e.g., "53") of the rectangle "H". Accordingly, the deformed image data G11 is generated.

That is, in other words, the aspect ratio of the deformed image data G11 is deformed to be matched with the aspect ratio of the rectangle "H". For example, when the aspect ratio of the rectangle "H" is a ratio of height:width="2:1", the aspect ratio of the image data G1 is also set as a ratio of "2:1". However, the aspect ratio after deformation may be adjusted within the range of the predetermined ratio. For example, the aspect ratio of the image data G1 may be changed within a range of the predetermined ratio, for example, "2.2:1.9", with respect to the aspect ratio of "2:1" of the rectangle "H".

By doing this, the component character combination unit 130 generate the deformed image data G11 from the image data G1. Further, the component character combination unit 130 determines each apex of the rectangle "H" in the input area "R" and each apex of the deformed image data G11 (e.g., an apex corresponding to the minimum coordinate among apex of the rectangle "H" and a corresponding apex of the deformed image data G11 in a case of adjusting the aspect ratio) to be disposed to overlap with each other.

Figure 15A:
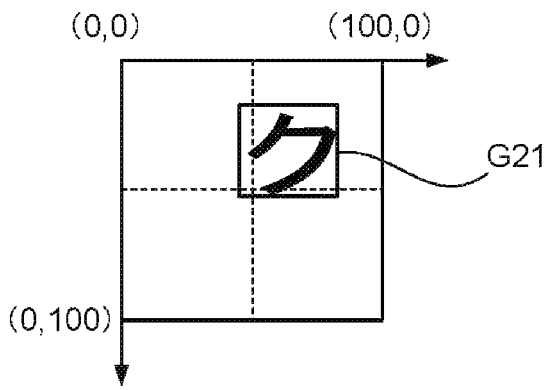
FIGS. 15A-15C are views illustrating an example of a composition of the deformed image data.
Figure 15B:
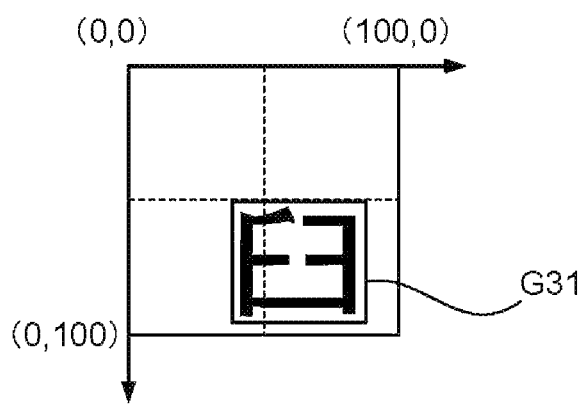
Figure 15C:
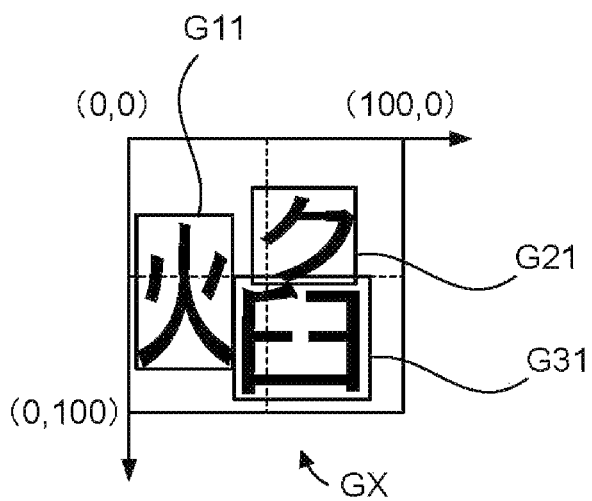

FIGS. 15A, 15B and 15C are views illustrating an example of a combination of the deformed image data. FIG. 15A exemplifies a deformed image data G21 for the component character "ク". FIG. 15B exemplifies a deformed image data G31 for the component character "曰". The component character combination unit 130 may generate the deformed image data G21 and G31 by applying the same method as described in FIG. 14.

FIG. 15C exemplifies a composite image data GX formed by composing the deformed image data G11, G21 and G31. The component character combination unit 130 disposes each of the deformed image data G11, G21 and G31 on the determined position to form a single image data, thereby obtaining the composite image data GX. The deformed image data G11, G21 and G31 are disposed in such a manner that respective apex of the deformed image data G11, G21 and G31 that are disposed are matched with respective apex of the rectangle which indicating an input area of each component character. Accordingly, an area of each of the deformed image data G11, G21 and G31 is matched with an area of each corresponding rectangle. Therefore, in other words, the area ratio of the deformed image data G11, G21 and G31 is deformed to be matched with the area ratio of each rectangle indicating an area in which each component character is input. For example, when the area ratio of each rectangle indicating the area in which each component character is input is a ratio of "4:3:6", the area ratio of the area in which the deformed image data G11, G21 and G31 are disposed is also set as a ratio of "4:3:6".

However, the area ratio may not be necessarily matched with the area ratio of the rectangle and may allow some difference in alignment. For example, when the area ratio of each rectangle indicating the area in which each component character is input is a ratio of "4:3:6", the area ratio of the area in which the deformed image data G11, G21 and G31 are disposed may be changed within a range of the predetermined ratio, for example, "3.8:3.1:6.3". The component character combination unit 130 outputs the composite image data GX to the character comparison unit 140.

Figure 16:
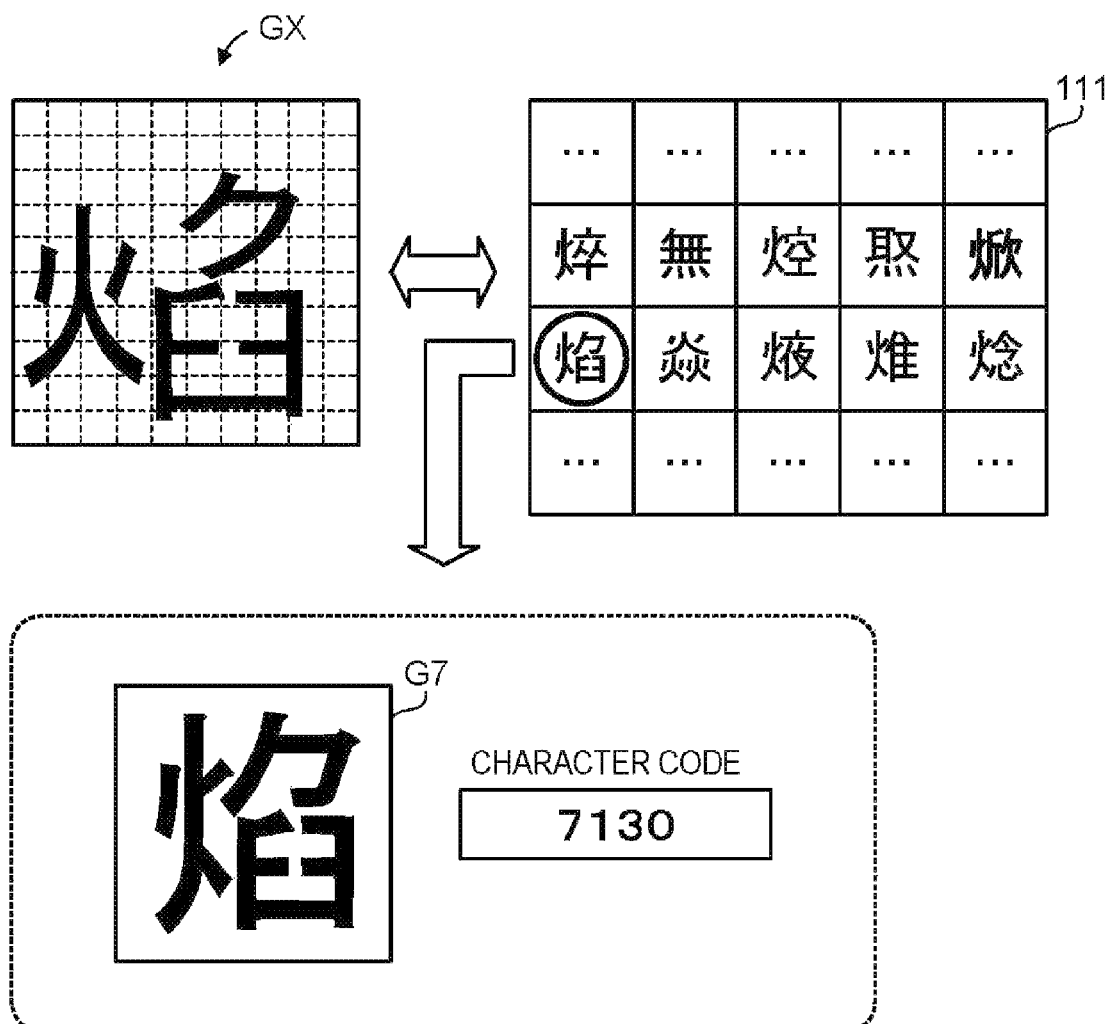
FIG. 16 is a view illustrating an example of an output of a final result.

FIG. 16 is a view illustrating an example of output of a final result. The character comparison unit 140 collates the composite image data GX with the image data of each character registered in the character shape table 111. Also, the character comparison unit 140 estimates an image data G7 which is most matched with the image data as the character input by the user. The character comparison unit 140 may display the image data G7 to prompt the user to confirm the image data G7. The character comparison unit 140 may acquire the character code associated with the image data G7 from the character shape table 111 to output the acquired character code to other software that runs on the client device 100. Further, the character comparison unit 140 may output the character code "7130" associated with the image data G7 to other device.

As described above, the client device 100 detects a plurality of component characters included in a single character and generates the composite image data GX formed by combining the component characters. Also, the client device 100 collates the composite image data GX with each character of the character shape table 111 to obtain a final character recognition result. Therefore, it is possible to recognize even the character, which is not registered in the dictionary table 112, with high accuracy. For example, when the character recognition is to be performed, the stroke information to become samples is prepared in advance for each target character to be recognized.

However, the number of characters is enormous and thus, it is not easy to collect stroke information for the character recognition in advance with respect to a handwriting input regarding all characters. For example, a variant character may be used in registration. Some variant characters used only in a very few registry office (e.g., one registry office). For example, it is difficult to extract the sample of stroke from about ten to thirty people to be tested for all of the variant characters that exists on the sequence of several ten thousands and usefulness is lower when comparing with work cost even though the strokes are registered. Therefore, the stroke information regarding the character which has a low use frequency such as a variant character or an external character may not be registered in the dictionary table 112.

Further, the user may arbitrarily register the character that was prepared by his own in the character shape table 111. It is difficult to prepare the stroke information to be used as sample in consideration of such a character.

Accordingly, how to recognize the character unregistered in the dictionary table 112 with high accuracy is in question. For example, there may also be a case where the image data which indicates a combination of lines input in handwriting is collated with the image data of each character registered in the character shape table 111. However, the line input in handwriting may be collapsed from the view point of a form as a character. Accordingly, when the image data which indicates a combination of lines input in handwriting is collated with the image data of each character registered in the character shape table 111, the accuracy of character recognition may be reduced.

In contrast, the client device 100 handles a single character as a combination of a plurality of component characters. That is, a character input in the input area R in handwriting by the user, who intends to input a single character, is detected by the client device 100 as a combination of a plurality of component characters. The client device 100 combines the image data of each component character recognized based on the dictionary table 112 to obtain the composite image data GX. In this case, the image data of the component character is deformed and combined based on information indicating the position of the character input by the user. Therefore, the component input as Chinese character radical such as "編" or "旁" may be reproduced using the image data registered in the character shape table 111 and appropriately reflected into the composite image data GX. Accordingly, it is possible to recognize with high accuracy than a case where the combination of lines input in handwriting is collated with the image data of the character shape table 111 without deforming.

Further, using existing stroke information, it is possible to easily perform the character recognition having high accuracy on even the variant character or external character for which the stroke information for the character recognition in handwriting is not prepared. Further, separate stroke information may not be prepared for a variant character or an external character having a low use frequency. Accordingly, it is possible to save the labor for the work of collecting and registering the stroke information to be used as the sample. Further, the character to be registered in the dictionary table 112 may be reduced to suppress the stroke information from being increased.

Further, as described above, the information processing of the first embodiment may be implemented by causing the operation unit 1b to execute the program. Further, the information processing of the second embodiment may be implemented by causing the processor 101 to execute the program. The program may be recorded in a computer readable recording medium (e.g., an optical disk, a memory device and a memory card).

For example, the recording medium having recorded the program therein may be distributed to circulate the program. Further, the program may be distributed via a network while being stored in other computer. The client device such as a computer may store (install), for example, a program recorded in the recording medium or a program received from other computer, in a RAM or HDD and read the program from the storage device to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a character recognition program that, when executed, causes a computer to perform a character recognition method, the character recognition method comprising:
   detecting a first information indicating an input position of each of a plurality of characters input through a handwriting input and a plurality of character codes associated with the plurality of characters;
   acquiring a plurality of first image data associated with each of the plurality of character codes by referring to a second information in which the character codes and image data of the characters are associated with each other;
   generating a second image data by combining the plurality of first image data based on the first information; and
   outputting an image data of a character associated with the second image data or a character code associated with the second image data by referring to the second information,
   wherein the generating includes:
      deforming the plurality of first image data based on the first information; and
      generating the second image data by combining the plurality of first image data deformed at the deforming,
   wherein the deforming includes:
      specifying a plurality of rectangles that indicate an area in which the plurality of characters are input based on the first information; and
      matching an aspect ratio of each of the plurality of the first image data deformed at the deforming to an aspect ratio of each of the plurality of rectangles.

2. The non-transitory computer-readable recording medium according to claim 1, wherein the deforming includes matching an area ratio of each of the plurality of first image data to an area ratio of each of the plurality of rectangles.

3. The non-transitory computer-readable recording medium according to claim 1, wherein the generating includes:
   specifying a relative positional relationship between input positions of the plurality of characters based on the first information; and
   maintaining the relative positional relationship to combine the plurality of first image data.

4. The non-transitory computer-readable recording medium according to claim 1, wherein the detecting includes:
   for each time when one stroke in handwriting is received, collating information indicating a reference stroke included in a dictionary data with a set of strokes that are not decided for forming a character, among input strokes, by referring to the dictionary data in which a plurality of associations between the character code and information indicating a reference stroke are registered each time; and
   detecting each of the plurality of character codes sequentially based on a collation result.

5. The non-transitory computer-readable recording medium according to claim 4, wherein the collating includes:
   calculating a similarity between the set of strokes that are not decided for forming a character and a plurality of reference strokes included in the dictionary data to acquire a character code associated with the reference stroke having the maximum similarity;
   deciding the character code acquired at the previous time for a set of strokes input up to the previous time among the set of strokes that are not decided for forming a character when the maximum similarity at the present time is less than or equal to the maximum similarity at the previous time and the maximum similarity at the previous time is equal to or larger than a threshold value.

6. The non-transitory computer-readable recording medium according to claim 5, wherein the collating includes:
   detecting the last character code among the plurality of character codes by deciding the character code acquired lastly for the set of strokes that are not decided for forming a character when inputting of the next stroke is not started within a limitation time after receiving input of the stroke.

7. The non-transitory computer-readable recording medium according to claim 1, wherein the second information is information of a character font maintained by the computer in advance or information prepared based on the information of the character font.

8. An information processing apparatus, comprising:
   a memory configured to store a first information in which a character code and an image data of a character are associated with each other; and
   a processor configured to:
      detect a second information indicating an input position of each of a plurality of characters input through a handwriting input and a plurality of character codes associated with the plurality of characters;
      acquire a plurality of first image data associated with the plurality of characters codes by referring to the first information;
      generate a second image data by combining the plurality of first image data based on the second information; and
      output an image data of the character associated with the second image data or the character code associated with the second image data by referring to the first information,
   wherein the generation of the second image includes:
      deforming the plurality of first image data based on the first information; and
      generating the second image data by combining the plurality of first image data deformed at the deforming, wherein the deforming includes:
  specifying a plurality of rectangles that indicate an area in which the plurality of characters are input based on the first information; and
  matching an aspect ratio of each of the plurality of the first image data deformed at the deforming to an aspect ratio of each of the plurality of rectangles.

9. A character recognition method, comprising:
detecting a first information indicating an input position of each of a plurality of characters input through a handwriting input and a plurality of character codes associated with the plurality of characters;
acquiring a plurality of first image data associated with each of the plurality of character codes by referring to a second information in which the character codes and image data of the characters are associated with each other;
generating a second image data by combining the plurality of first image data based on the first information; and
outputting an image data of a character associated with the second image data or a character code associated with the second image data by referring to the second information,
wherein the generating includes:
  deforming the plurality of first image data based on the first information; and
  generating the second image data by combining the plurality of first image data deformed at the deforming,
  wherein the deforming includes:
    specifying a plurality of rectangles that indicate an area in which the plurality of characters are input based on the first information; and
    matching an aspect ratio of each of the plurality of the first image data deformed at the deforming to an aspect ratio of each of the plurality of rectangles.

10. The character recognition method according to claim 9, wherein the deforming includes matching an area ratio of each of the plurality of first image data to an area ratio of each of the plurality of rectangles.

11. The character recognition method according to claim 9, wherein the generating includes:
  specifying a relative positional relationship between input positions of the plurality of characters based on the first information; and
  maintaining the relative positional relationship to combine the plurality of first image data.

12. The character recognition method according to claim 9, wherein the detecting includes:
  for each time when one stroke in handwriting is received, collating information indicating a reference stroke included in a dictionary data with a set of strokes that are not decided for forming a character, among input strokes, by referring to the dictionary data in which a plurality of associations between the character code and information indicating a reference stroke are registered each time; and
  detecting each of the plurality of character codes sequentially based on a collation result.

13. The character recognition method according to claim 12, wherein the collating includes:
  calculating a similarity between the set of strokes that are not decided for forming a character and a plurality of reference strokes included in the dictionary data to acquire a character code associated with the reference stroke having the maximum similarity;
  deciding the character code acquired at the previous time for a set of strokes input up to the previous time among the set of strokes that are not decided for forming a character when the maximum similarity at the present time is less than or equal to the maximum similarity at the previous time and the maximum similarity at the previous time is equal to or larger than a threshold value.

14. The character recognition method according to claim 13, wherein the collating includes:
  detecting the last character code among the plurality of character codes by deciding the character code acquired lastly for the set of strokes that are not decided for forming a character when inputting of the next stroke is not started within a limitation time after receiving input of the stroke.

15. The character recognition method according to claim 9, wherein the second information is information of a character font maintained by the computer in advance or information prepared based on the information of the character font.

* * * * *